US012689146B2

(12) United States Patent
Miyamura

(10) Patent No.: US 12,689,146 B2
(45) Date of Patent: Jul. 21, 2026

(54) CONNECTOR WITH INTEGRALLY MOLDED RESIN PORTIONS OF DIFFERENT MATERIALS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tetsuya Miyamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 298 days.

(21) Appl. No.: 18/276,009

(22) PCT Filed: Feb. 3, 2022

(86) PCT No.: PCT/JP2022/004150
§ 371 (c)(1),
(2) Date: Aug. 4, 2023

(87) PCT Pub. No.: WO2022/181276
PCT Pub. Date: Sep. 1, 2022

(65) Prior Publication Data

US 2024/0120678 A1 Apr. 11, 2024

(30) Foreign Application Priority Data

Feb. 24, 2021 (JP) ................................ 2021-027097

(51) Int. Cl.
*H01R 13/424* (2006.01)
*H01R 13/506* (2006.01)
*H01R 43/18* (2006.01)

(52) U.S. Cl.
CPC ......... *H01R 13/424* (2013.01); *H01R 13/506* (2013.01); *H01R 43/18* (2013.01)

(58) Field of Classification Search
None
See application file for complete search history.

(56) References Cited

U.S. PATENT DOCUMENTS 5,647,777 A 7/1997 Sasai et al.
6,702,627 B2 * 3/2004 Nankou ............. H01R 13/4361 439/752

(Continued)

FOREIGN PATENT DOCUMENTS

JP H09-057787 A 3/1997
JP H10-162925 A 6/1998
JP 2020-017544 A 1/2020

OTHER PUBLICATIONS

International Search Report issued on Mar. 29, 2022 for WO 2022/181276 A1 (4 pages).

*Primary Examiner* — Oscar C Jimenez
(74) *Attorney, Agent, or Firm* — Venjuris, P.C.

(57) ABSTRACT

It is aimed to provide a connector not requiring a dedicated assembling facility. A connector (10) is provided with a primary molding portion (20A) made of a primary resin material and a secondary molding portion (50A) made of a secondary resin material. The secondary molding portion (50A) is provided relatively movably with respect to the primary molding portion (20A).

6 Claims, 8 Drawing Sheets

(56) References Cited

U.S. PATENT DOCUMENTS

| | | | | |
|---|---|---|---|---|
| 2002/0127921 | A1 | 9/2002 | Kashiyama | |
| 2006/0189219 | A1* | 8/2006 | Yamashita | H01R 13/4362<br>439/752 |
| 2019/0044270 | A1 | 2/2019 | Miyamura et al. | |
| 2019/0173224 | A1* | 6/2019 | Inoue | H01R 13/5219 |
| 2020/0112125 | A1* | 4/2020 | Liptak | H01R 13/424 |
| 2021/0184387 | A1 | 6/2021 | Miyamura | |
| 2022/0352668 | A1* | 11/2022 | Sekino | H01R 13/631 |
| 2024/0154346 | A1* | 5/2024 | Miyamura | B29C 45/16 |

* cited by examiner

CONNECTOR WITH INTEGRALLY MOLDED RESIN PORTIONS OF DIFFERENT MATERIALS

CROSS REFERENCE TO RELATED APPLICATIONS

This application is a national phase of PCT application No. PCT/JP2022/004150, filed on 3 Feb. 2022, which claims priority from Japanese patent application No. 2021-027097, filed on 24 Feb. 2021, all of which are incorporated herein by reference.

TECHNICAL FIELD

The present disclosure relates to a connector.

BACKGROUND

A connector described in Patent Document 1 is provided with a connector housing, a retainer and a front holder. The retainer and the front holder are respectively assembled movably with respect to the connector housing. A terminal fitting is inserted into the connector housing. The terminal fitting is restricted from coming out from the connector housing by the retainer, and stopped in front by the front holder. Any of the connector housing, the retainer and the front holder is made of synthetic resin.

PRIOR ART DOCUMENT

Patent Document

Patent Document 1: JP 2017-143009 A

SUMMARY OF THE INVENTION

Problems to be Solved

The connector housing, the retainer and the front holder are individually molded using molds respectively corresponding thereto, and assembled in an assembling facility. Thus, a dedicated assembling facility is required, which may lead to a cost increase.

Accordingly, the present disclosure aims to provide a connector not requiring a dedicated assembling facility.

Means to Solve the Problem

The present disclosure is directed to a connector with a primary molding portion made of a primary resin material and a secondary molding portion made of a secondary resin material, the secondary molding portion being provided relatively movably with respect to the primary molding portion.

Effect of the Invention

According to the present disclosure, it is possible to provide a connector not requiring a dedicated assembling facility.

DETAILED DESCRIPTION TO EXECUTE THE INVENTION

Description of Embodiments of Present Disclosure

Figure 1:
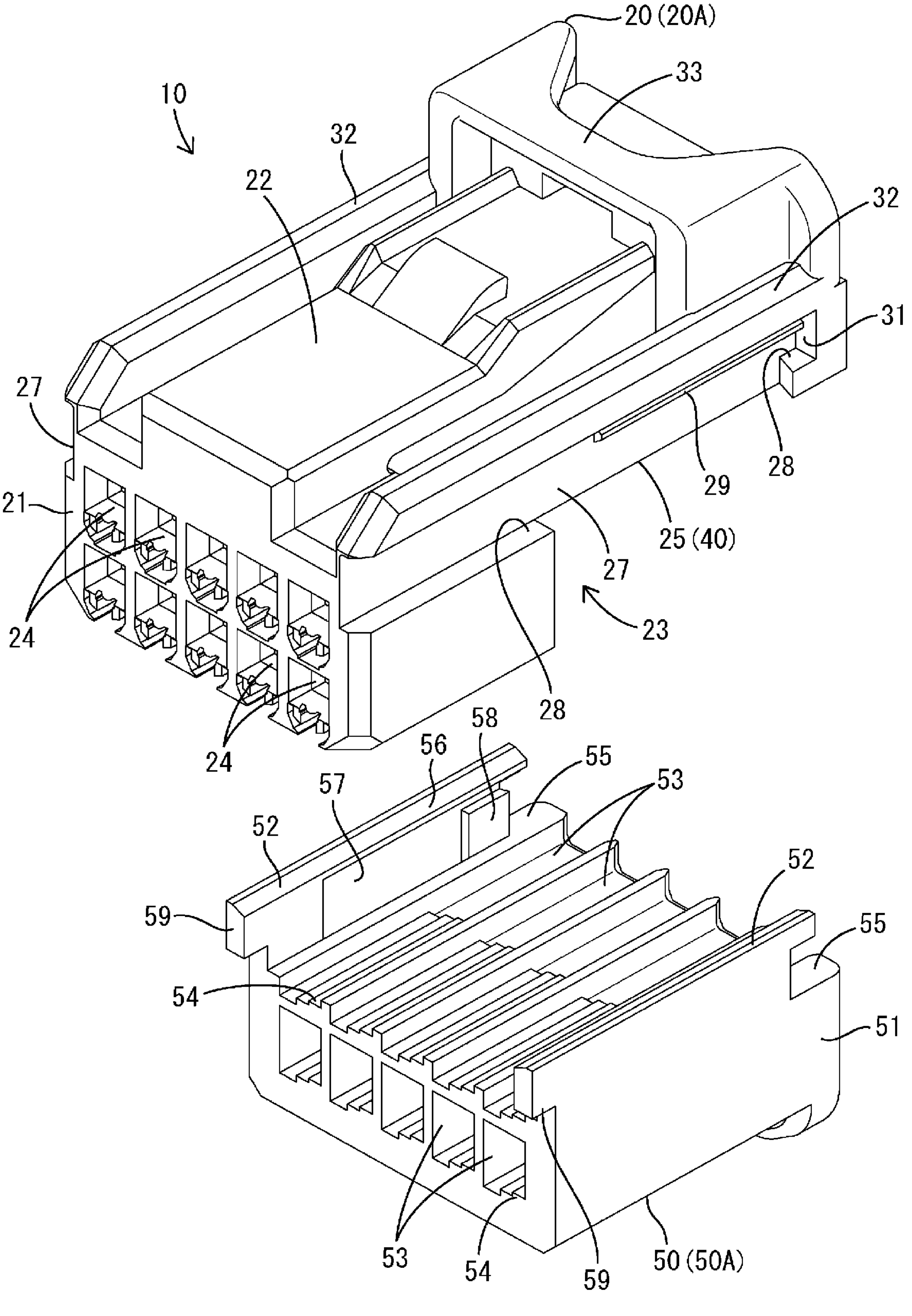
FIG. 1 is an exploded perspective view of a connector according to an embodiment of the present disclosure.

First, embodiments of the present disclosure are listed and described.

(1) The connector of the present disclosure is provided with a primary molding portion made of a primary resin material and a secondary molding portion made of a secondary resin material, the secondary molding portion being provided relatively movably with respect to the primary molding portion.

According to the above configuration, since the primary molding portion and the secondary molding portion can be molded by two-color molding, a dedicated assembling facility is not required.

(2) Preferably, the primary molding portion includes a locking portion, the secondary molding portion includes a lock receiving portion for restricting a relative movement of the secondary molding portion by being locked to the locking portion, and the locking portion and the lock receiving portion extend in a direction intersecting a moving direction of the secondary molding portion and face and contact each other in parallel.

According to the above configuration, a holding force of the primary molding portion and the secondary molding portion can be improved since the locking of the locking portion and the lock receiving portion can be strengthened.

Note that if a connector housing and a retainer are assembled in an assembling facility as before, it is difficult to ensure a holding force of the connector housing and the retainer since difficulty to separate after the assembling and easiness to assemble have to be considered. In contrast, since the primary molding portion and the secondary molding portion can be molded by two-color molding in the case of the connector of the present disclosure, assemblability needs not be considered and the above configuration can be satisfactorily realized.

(3) The primary resin material and the secondary resin material may be different resin materials, the primary molding portion may be a connector housing, the secondary molding portion may be a retainer, the connector housing may include a resiliently deformable locking lance for primarily locking a terminal fitting, and the retainer may include a retaining portion for secondarily locking the terminal fitting.

According to the above configuration, the connector housing including the resiliently deformable locking lance and the retainer including the retaining portion can be molded using resin materials suitable for each in view of functions and cost of each.

(4) The connector housing may include a retainer accommodation recess for accommodating the retainer, and the retainer accommodation recess may be open from a surface side facing the retainer in the moving direction of the retainer to a surface side facing the terminal fitting in an inserting direction of the terminal fitting.

According to the above configuration, since the retainer accommodation recess is open over two surfaces, resin fillability and mold releasability can be improved and two-color molding can be easily performed.

Details of Embodiment of Present Disclosure

A specific example of a connector 10 according to an embodiment of the present disclosure is described with reference to the drawings. Note that the present invention is not limited to this illustration, but is represented by claims and intended to include all changes in the scope of claims and in the meaning and scope of equivalents.

The connector 10 is provided with a connector housing 20, a retainer 50 and terminal fittings 80. The connector housing 20 and the retainer 50 are made of resin materials, which are both synthetic resins and different from each other. The connector housing 20 is a primary member primarily molded by two-color molding and constituted as a primary molding portion 20A. The retainer 50 is a secondary member secondarily molded by two-color molding and constituted as a secondary molding portion 50A.

The connector housing 20 and the retainer 50 are molded from a main common mold in two-color molding. Specifically, after the connector housing 20 is molded as the primary molding portion 20A using a primary resin material, a secondary resin material is filled into later-described retainer accommodation recess 23 and recessed grooves 27 in the connector housing 20, whereby the retainer 50 serving as the secondary molding portion 50A is molded. In the case of this embodiment, the primary resin material for constituting the connector housing 20 is PBT (Polybutylene Terephthalate), and the secondary resin material for constituting the retainer 50 is PP (Polypropylene).

Figure 3:
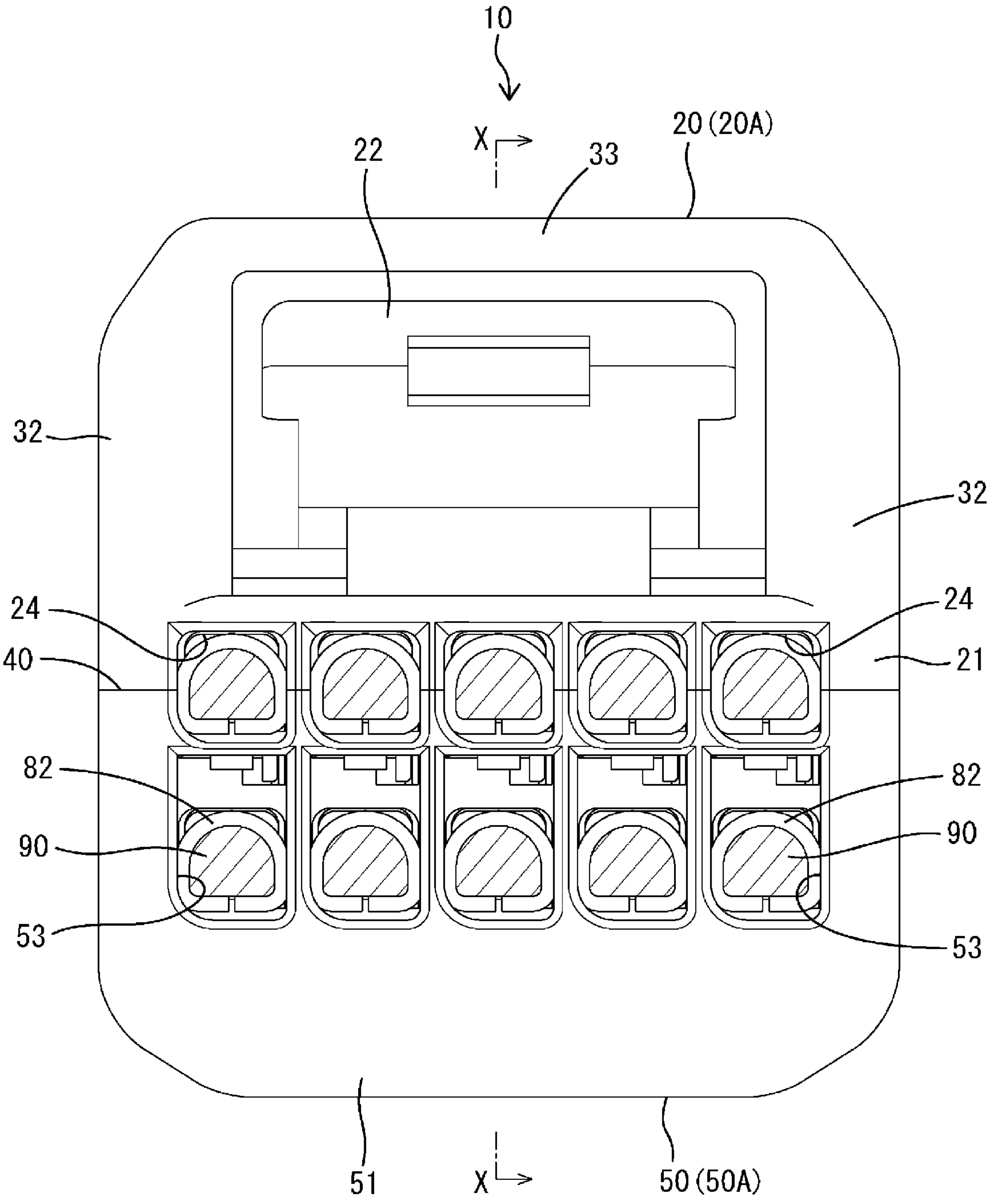
FIG. 3 is a back view of the connector.
Figure 7:
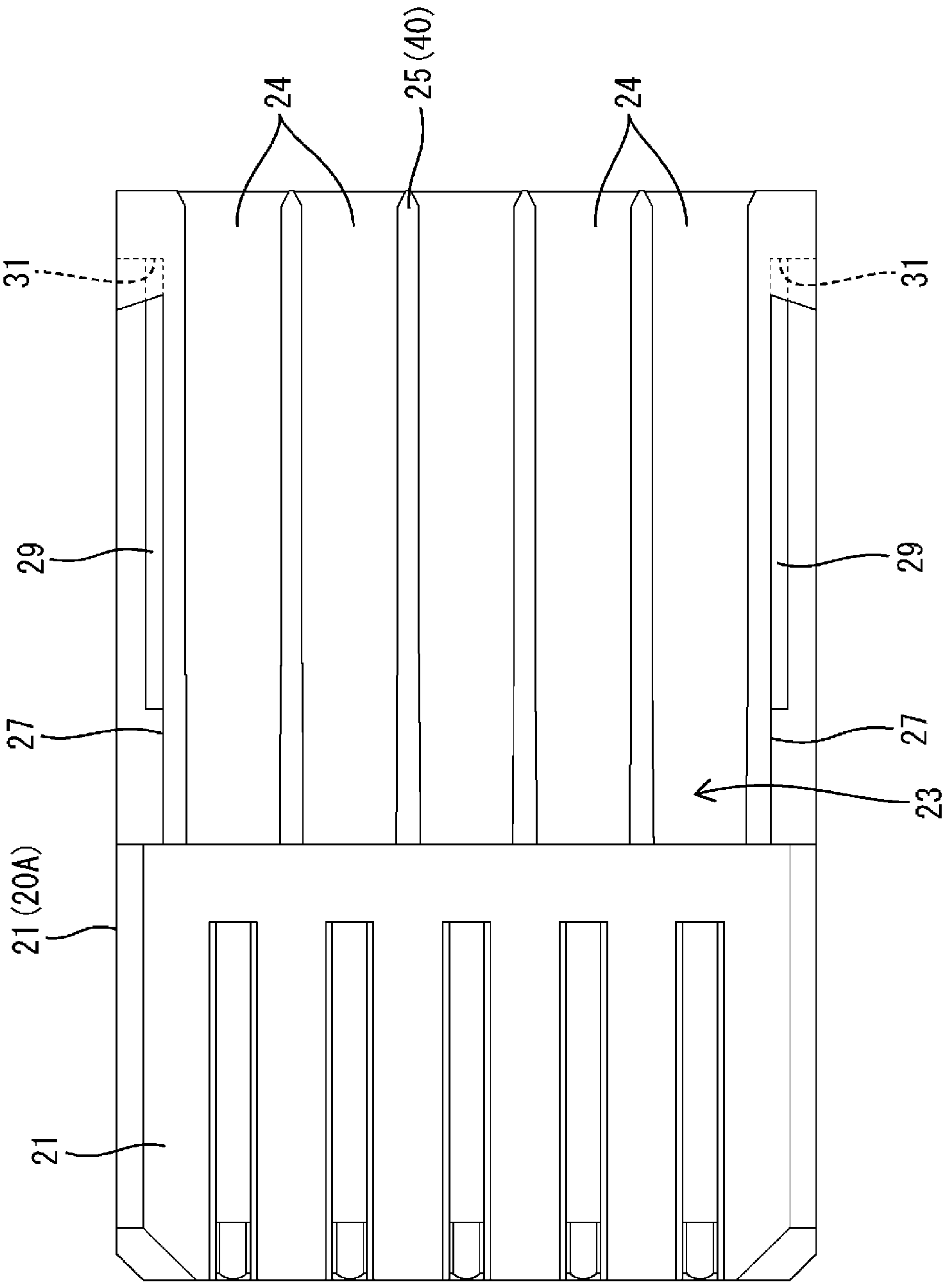
FIG. 7 is a bottom view of the housing.

The connector housing 20 is connected to an unillustrated mating connector housing. Note that, in the following description, a surface side of the connector housing 20 facing the mating connector housing is referred to as a front side concerning a front-rear direction. A left side of each figure except FIG. 3 is a front side. A vertical direction is based on a vertical direction of each figure except FIGS. 7 and 8.

As shown in FIG. 1, the connector housing 20 includes a housing body 21 and a lock arm 22 extending rearward from the front end of the upper surface of the housing body 21. The housing body 21 includes the retainer accommodation recess 23 capable of accommodating the retainer 50 in a rear part. The retainer accommodation recess 23 is open from the lower surface to the rear surface of the housing body 21. The lower surface of the housing body 21 is a surface arranged on the front side of FIG. 7 in a bottom view of the connector housing 20, and a surface facing in a moving direction when the retainer 50 relatively moves with respect to the connector housing 20 as described later. The rear surface of the housing body 21 is a surface arranged on the front side of FIG. 3 in a back view of the connector housing 20, and a surface facing an inserting direction when the terminal fitting 80 is inserted into the connector housing 20 as described later. A rear-lower part of the housing body 21 is cut to have an L shape in a side view by the retainer accommodation recess 23 and is open rearward and downward.

Figure 5:
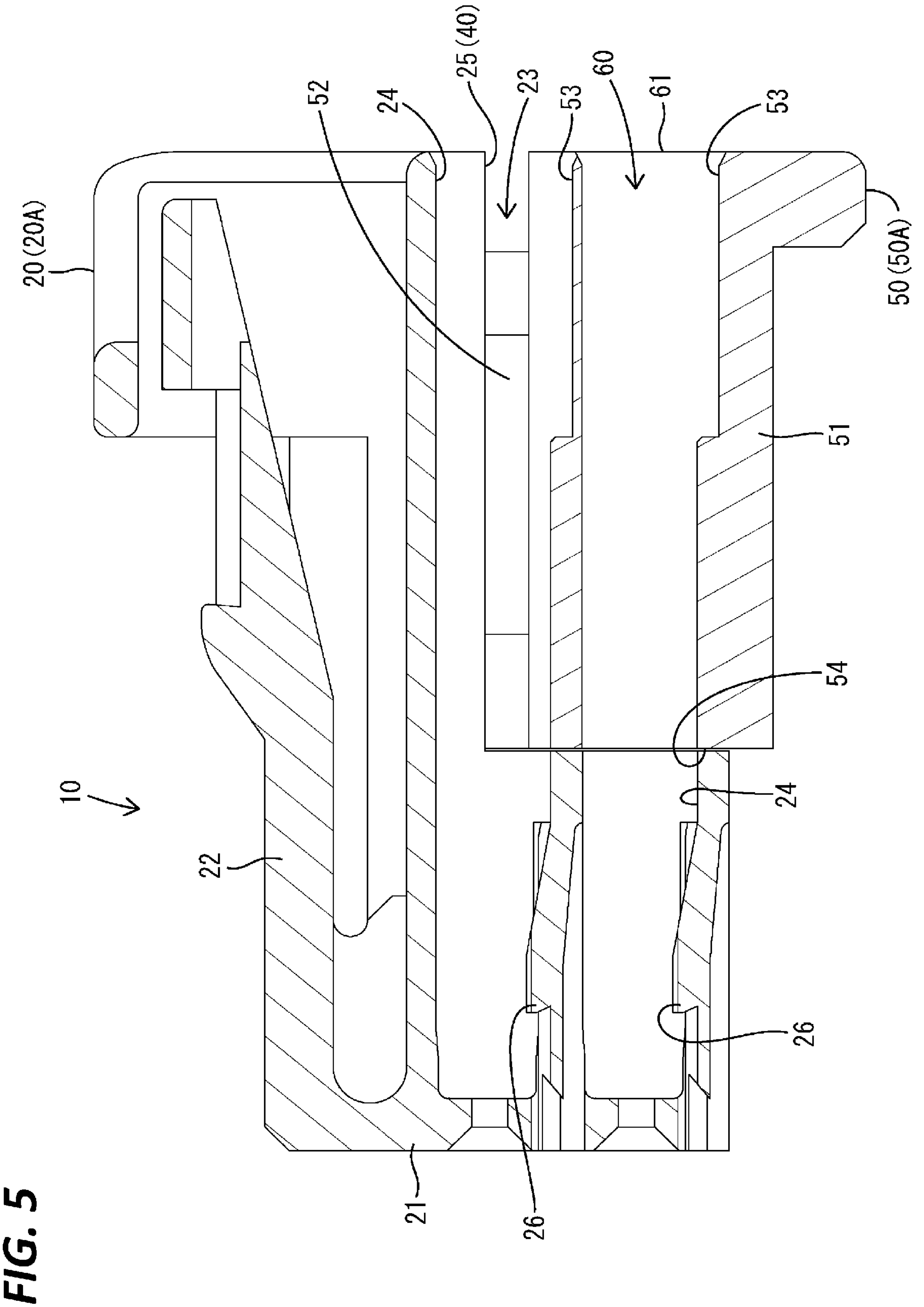
FIG. 5 is a side view in section showing a state where a retainer is arranged at a temporary locking position with respect to a housing.

The housing body 21 includes a plurality of housing-side cavities 24. The respective housing-side cavities 24 extend in the front-rear direction, and a plurality of the housing-side cavities 24 are arranged in a width direction in each of two upper and lower stages. As shown in FIG. 5, the housing-side cavity 24 in the upper stage includes an open portion 25 open downward in the lower end of a rear part. The open portion 25 forms a boundary 40 defining between the housing-side cavity 24 and the retainer 50. The housing-side cavity 24 is in the form of a hole closed over an entire periphery except the open portion 25, and open to the retainer accommodation recess 23.

The housing body 21 includes locking lances 26 projecting into the respective housing-side cavities 24. The locking lance 26 is shaped to project forward from the lower surface of the housing-side cavity 24, and resiliently deformable in the vertical direction.

Figure 2:
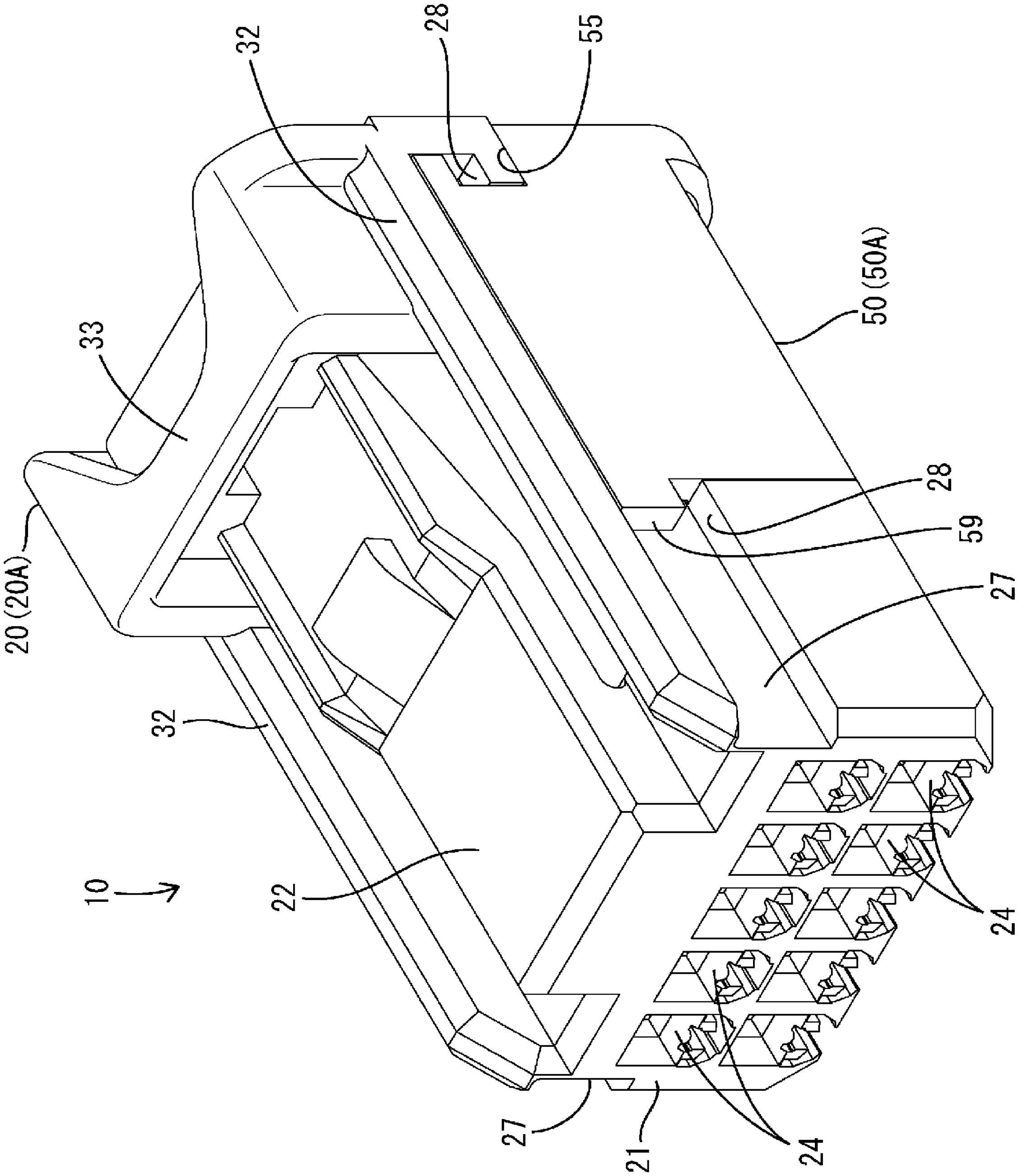
FIG. 2 is a perspective view of the connector.

As shown in FIGS. 1 and 2, the housing body 21 includes the recessed grooves 27 extending in the front-rear direction and open in the front surface of the housing body 21 in upper parts of both left and right side surfaces. The upper and lower surfaces of the recessed groove 27 are arranged in parallel along the front-rear direction. A rear part of the recessed groove 27 communicates with the retainer accommodation recess 23.

The housing body 21 includes first locking portions 28 at front and rear positions of the lower surfaces of the recessed grooves 27 across the upper end of the retainer accommodation recess 23. The front and rear first locking portions 28 are formed on the lower surface of the recessed groove 27 without forming any step. Further, the housing body 21 includes rib-like second locking portions 29 extending in the front-rear direction on back surfaces along the front-rear direction in rear parts of the recessed grooves 27. The rear end of the second locking portion 29 is coupled to a closing surface 31 closing the rear end of the recessed groove 27.

The lock arm 22 resiliently locks the unillustrated mating connector housing and holds the connector housing 20 and the mating connector housing in a connected state. The connector housing 20 includes protection walls 32 rising from both left and right end parts of the upper surface of the housing body 21 and a bridge portion 33 bridged between the upper ends of rear parts of the left and right protection walls 32. The protection walls 32 are arranged above the recessed grooves 27. The bridge portion 33 is arranged above the lock arm 22 to restrict excessive deflection of the lock arm 22 and an inadvertent unlocking operation of the lock arm 22.

The retainer 50 is divided from the connector housing 20 after two-color molding. As shown in FIG. 1, the retainer 50 includes a retainer body 51 and side walls 52 rising from both left and right end parts of the upper surface of the retainer body 51. The retainer body 51 is shaped to conform to the retainer accommodation recess 23, and the side walls 52 are shaped to conform to the rear parts of the recessed grooves 27.

The retainer body 51 includes a plurality of retainer-side cavities 53. The respective retainer-side cavities 53 are arranged side by side in the width direction in two upper and lower stages. The retainer-side cavity 53 in the lower stage is in the form of a hole closed over an entire periphery. The retainer-side cavity 53 in the upper stage is in the form of a recess open upward, and connected to the open portion 25 of the housing-side cavity 24 in the upper stage when the retainer 50 is assembled with the connector housing 20, thereby forming a hole closed over an entire periphery. As shown in FIG. 5, each retainer-side cavity 53 and each housing-side cavity 24 communicate in the front-rear direction to form an insertion path 60 for the terminal fitting 80.

The rear end of the retainer-side cavity 53 is open in the rear surface of the retainer body 51 via an insertion opening 61. The retainer-side cavity 53 includes a retaining portion 54 in a front part. The retaining portion 54 is in the form of a rib extending in the front-rear direction and, as shown in FIG. 4, the front end thereof is lockable to the terminal fitting 80.

Figure 8:
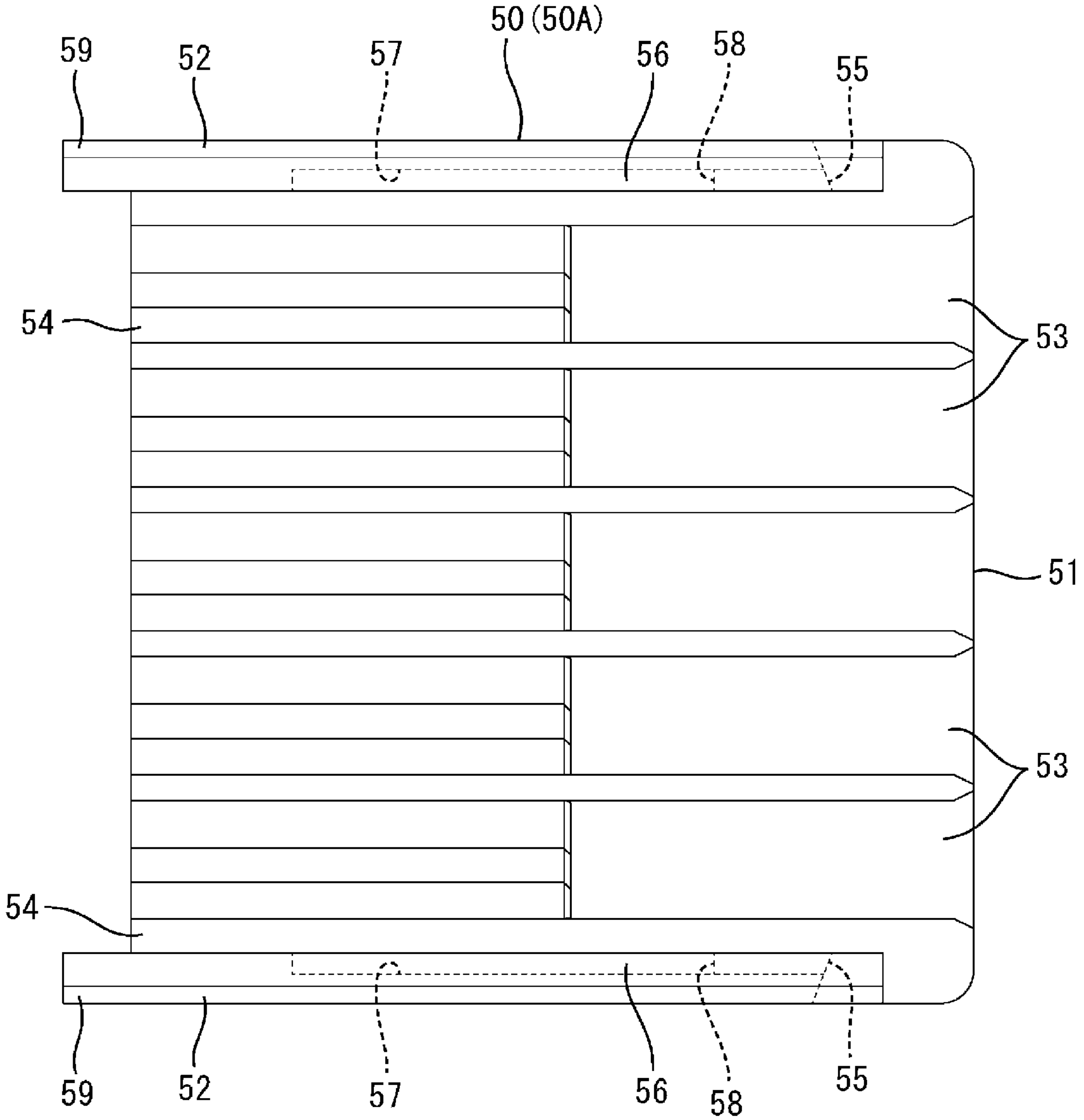
FIG. 8 is a plan view of the retainer.

As shown in FIG. 1, the side wall 52 is in the form of a plate long in the front-rear direction, and resiliently deformable in the width direction with a lower end part connected to the retainer body 51 as a fulcrum. The side wall 52 includes a cut portion 55 open in the form of a rectangular recess in a rear end. Further, as shown in FIGS. 1 and 8, the side wall 52 includes, in an upper part, a rib-like body lock receiving portion 56 extending in the front-rear direction while defining the upper end of the cut portion 55. The inner surface of the side wall 52 includes a recess 57 below the body lock receiving portion 56 and a projecting base portion 58 in the form of a rectangular base defining the rear end of the recess 57 in a rear end part.

Figure 6:
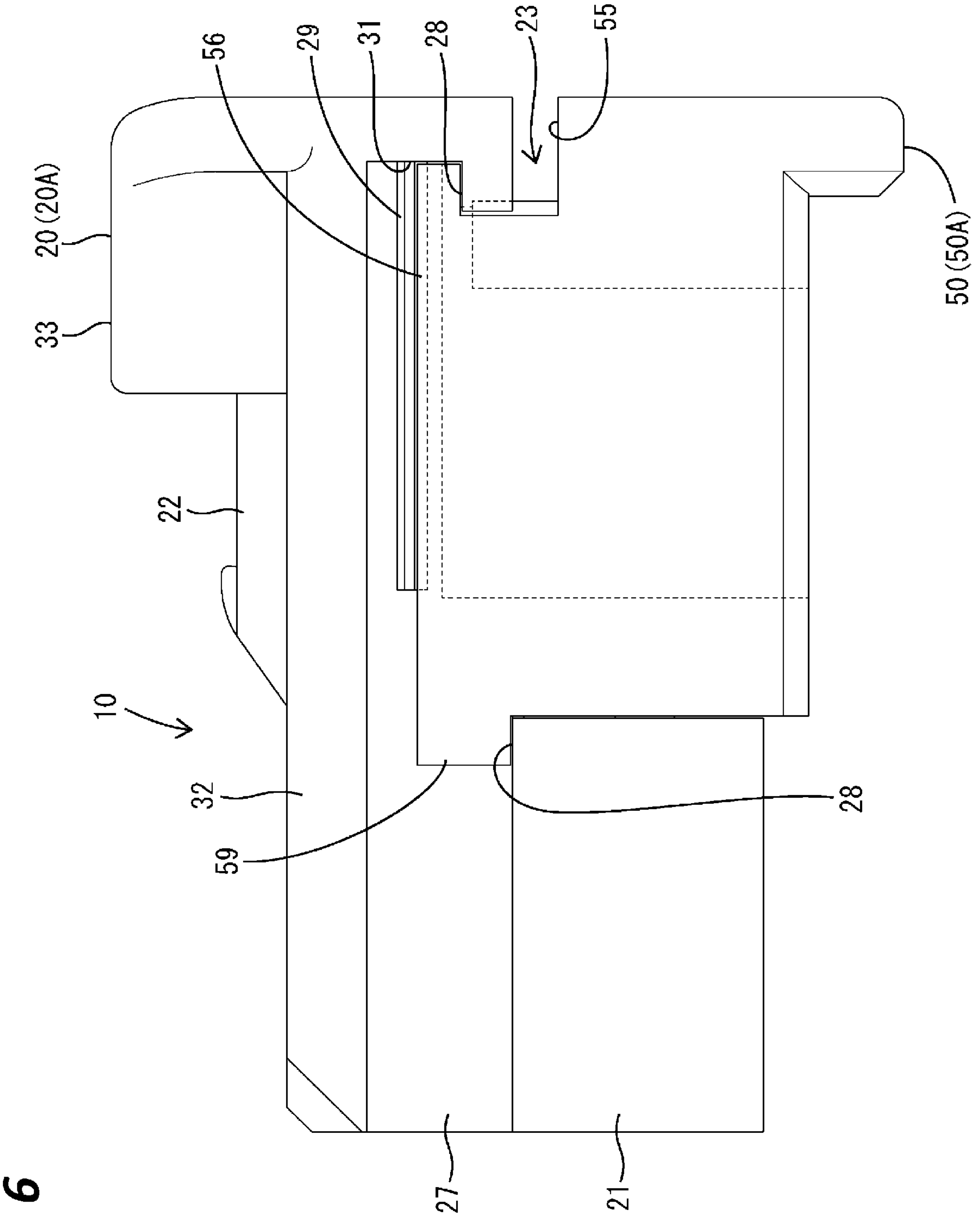
FIG. 6 is a side view showing the state where the retainer is arranged at the temporary locking position with respect to the housing.

The side wall 52 includes a front lock receiving portion 59 in the form of a rectangular plate projecting forward from the upper end of an upper part while being continuous with the body lock receiving portion 56. As shown in FIG. 6, the front lock receiving portion 59 can be supported such that a lower end thereof is held in contact with the front first locking portion 28.

Figure 4:
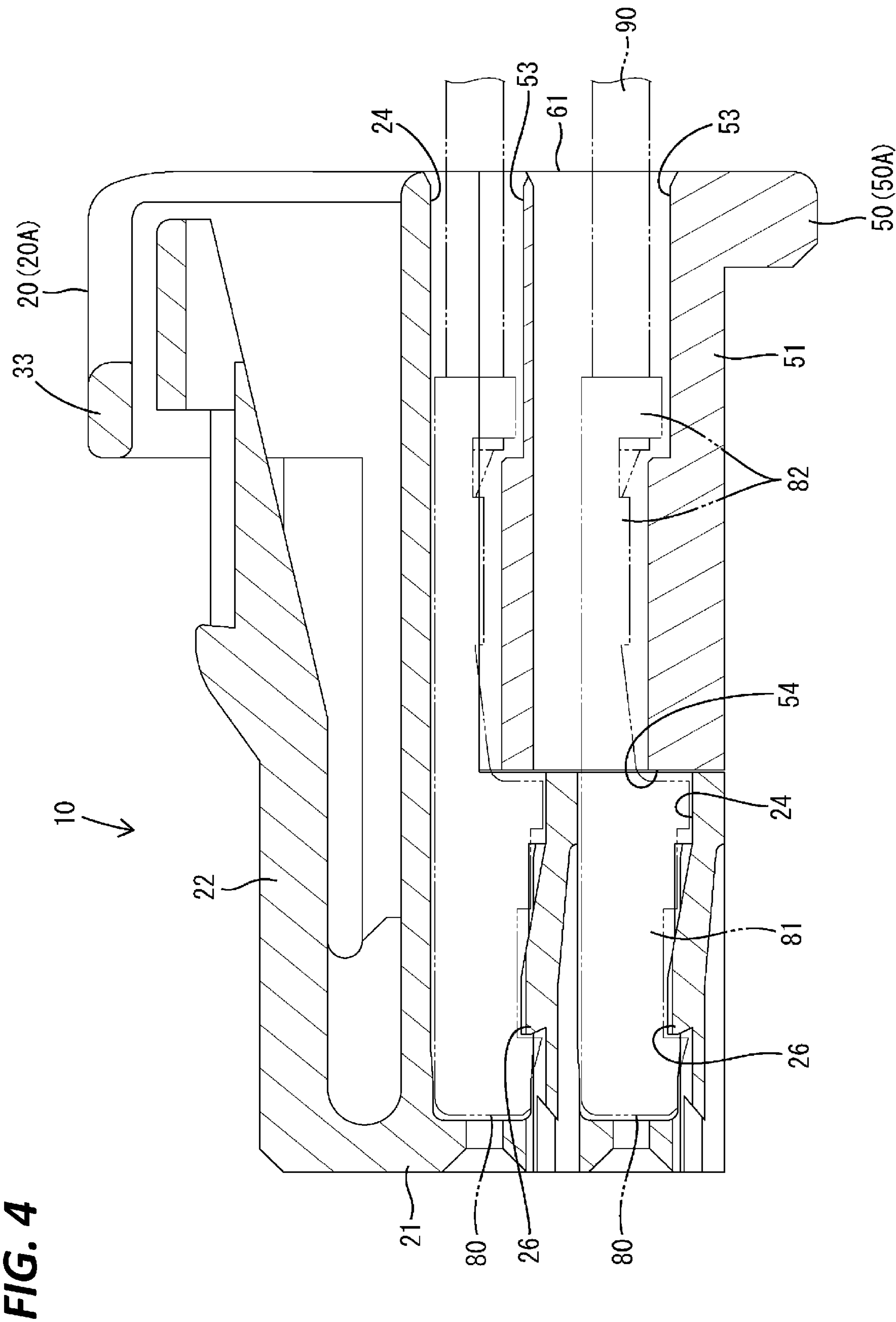
FIG. 4 is a section along X-X of FIG. 3.

The terminal fitting 80 is made of electrically conductive metal and includes, as shown in FIG. 4, a tubular connecting portion 81 in a front part and a barrel portion 82 in the form of an open barrel in a rear part. The barrel portion 82 is crimped and connected to an end part of a wire 90. The connecting portion 81 is connected to an unillustrated mating terminal fitting inserted thereinto.

In manufacturing the connector 10, the connector housing 20 serving as the primary molding portion 20A is first molded using the primary resin material. Subsequently, the molded connector housing 20 is set in a molding area on the secondary side, the secondary resin material is filled into hollow parts corresponding to the retainer accommodation recess 23 and the like, and the retainer 50 serving as the secondary molding portion 50A is molded. Thereafter, when being demolded, the connector housing 20 and the retainer 50 are simultaneously obtained. Here, the primary resin material and the secondary resin material are mutually different materials and do not have a bonding force enough to bond/adhere the connector housing 20 and the retainer 50. Thus, the connector housing 20 and the retainer 50 are obtained in a state integrated, but dividable. As shown in FIG. 3, the connector 10 is formed with the boundary 40 along the width direction at a height position where the housing-side cavities 24 in the upper stage and the retainer-side cavities 53 in the upper stages are connected in a back view.

From a state where the connector housing 20 and the retainer 50 are divided, the retainer 50 is fit into the retainer accommodation recess 23 again and assembled at a temporary locking position with respect to the connector housing 20. At the temporary locking position, parts of the body lock receiving portions 56 defining the upper ends of the cut portions 55 come into contact with the rear first locking portions 28 from above, and the front lock receiving portions 59 come into contact with the front first locking portions 28 from above, whereby the retainer 50 is restricted from coming out downward from the connector housing 20 as shown in FIG. 6. Further, by the contact of the body lock receiving portions 56 with the second locking portions 29 from below, the retainer 50 is restricted from moving upward toward a complete locking position with respect to the connector housing 20.

At the temporary locking position, the lower surfaces of the housing-side cavities 24 and the upper surfaces of the retaining portions 54 of the retainer-side cavities 53 are continuous in the front-rear direction at the same height, and the upper surfaces of the housing-side cavities 24 and the upper surfaces of the retainer-side cavities 53 are continuous in the front-rear direction at the same height, thereby forming the insertion paths 60 for the terminal fittings 80 as shown in FIG. 5. The connecting portion 81 of the terminal fitting 80 is inserted into the housing-side cavity 24 by way of the retainer-side cavity 53 from the insertion opening 61, and resiliently locked by the locking lance 26. In this way, the terminal fittings 80 are primarily retained in the connector housing 20 and the retainer 50.

Subsequently, the retainer 50 is pushed upward and brought to the complete locking position. At the complete locking position, the body lock receiving portions 56 come into contact with the second locking portions 29 from above, whereby the retainer 50 is restricted from moving in a return direction to the temporary locking position. Further, as shown in FIG. 2, the upper ends of the side walls 52 including the body lock receiving portions 56 and the front lock receiving portions 59 come into contact with the upper surfaces of the recessed grooves 27, whereby the retainer 50 is restricted from moving further upward than the complete locking position. Furthermore, the second locking portions 29 are sandwiched and positioned between the body lock receiving portions 56 and the projecting base portions 58.

At the complete locking position, as shown in FIG. 4, the retaining portions 54 are moved further upward than the lower surfaces of the housing-side cavities 24 and arranged to be lockable to the rear ends of the connecting portions 81 of the terminal fittings 80. In this way, the terminal fittings 80 are secondarily retained with respect to the connector housing 20 and the retainer 50.

At the complete locking position, the body lock receiving portions 56 and the second locking portions 29 extend along the front-rear direction, which is a direction orthogonal to a moving direction of the retainer 50 and face and contact each other in parallel. Further, the upper ends of the side walls 52 and the upper surfaces of the recessed grooves 27 also extend along the front-rear direction and face and contact each other in parallel. Similarly, at the temporary locking position, the front lock receiving portions 59, the body lock receiving portions 56 and the first locking portions 28 extend along the front-rear direction and face and contact each other in parallel. Thus, at the temporary locking position and the complete locking position, the retainer 50 is stably held in the connector housing 20.

As described above, according to this embodiment, the connector housing 20 serving as the primary molding portion 20A and the retainer 50 serving as the secondary molding portion 50A are molded by two-color molding. Thus, a dedicated assembling facility is unnecessary and cost can be reduced accordingly.

Further, since assemblability needs not be considered by molding the connector housing 20 and the retainer 50 by two-color molding, the first locking portions 28 and the body lock receiving portions 56 can be shaped to contact each other while facing in parallel, and the retainer 50 is stably held in the connector housing 20.

Furthermore, in the case of this embodiment, the connector housing 20 includes the retainer accommodation recess 23 for accommodating the retainer 50, and the retainer accommodation recess 23 is open from the lower surface side facing the retainer 50 in the moving direction of the retainer 50 to the rear surface side facing the terminal fittings 80 in the inserting direction of the terminal fittings 80 in the connector housing 20. Thus, resin fillability in filling the secondary resin material into the hollow parts corresponding to the retainer accommodation recess 23 and the like is excellent and mold releasability is also satisfactory.

Other Embodiments of Present Disclosure

The embodiment disclosed this time should be considered illustrative in all aspects, rather than restrictive.

Although the primary resin material and the secondary resin material are different materials in the case of the above embodiment, the primary resin material and the secondary resin material may be the same material according to another embodiment.

Although the retainer is configured to relatively move with respect to the connector housing in the case of the above embodiment, a front mask may be configured to relatively move with respect to the connector housing instead of the retainer according to another embodiment. Further, the secondary molding portion is not limited to the retainer and the front mask, but may be a member relatively movable with respect to the connector housing serving as the primary molding portion.

Although the secondary molding portion is configured to move with respect to the primary molding portion in the case of the above embodiment, the primary molding portion may be configured to move with respect to the secondary molding portion according to another embodiment. In this case, the connector housing may be configured as the secondary molding portion.

LIST OF REFERENCE NUMERALS

10 . . . connector
20 . . . connector housing
20A . . . primary molding portion
21 . . . housing body
22 . . . lock arm
23 . . . retainer accommodation recess
24 . . . housing-side cavity
25 . . . open portion
26 . . . locking lance
27 . . . recessed groove
28 . . . first locking portion (locking portion)
29 . . . second locking portion (locking portion)
31 . . . closing surface
32 . . . protection wall
33 . . . bridge portion
40 . . . boundary
50 . . . retainer
50A . . . secondary molding portion
51 . . . retainer body
52 . . . side wall
53 . . . retainer-side cavity
54 . . . retaining portion
55 . . . cut portion
56 . . . body lock receiving portion (lock receiving portion)
57 . . . recess
58 . . . projecting base portion
59 . . . front lock receiving portion (lock receiving portion)
60 . . . insertion path
61 . . . insertion opening
80 . . . terminal fitting
81 . . . connecting portion
82 . . . barrel portion
90 . . . wire

What is claimed is:

1. A connector, comprising:

a primary molding portion made of a primary resin material; and a secondary molding portion made of a secondary resin material, wherein the secondary molding portion being provided relatively movably with respect to the primary molding portion, wherein the primary resin material and the secondary resin material being resin materials unbondable to each other so that the integrally molded primary molding portion and secondary molding portion are dividable, wherein the primary molding portion and the secondary molding portion are integrally molded together by two-color molding such that the primary molding portion and the secondary molding portion are separable from each other along a boundary surface, and wherein the primary molding portion includes a housing-side cavity having an open portion in a lower end thereof, the open portion forming the boundary surface between the housing-side cavity and the secondary molding portion.

2. The connector of claim 1, wherein the primary molding portion includes a locking portion, the secondary molding portion includes a lock receiving portion for restricting a relative movement of the secondary molding portion by being locked to the locking portion, and the locking portion and the lock receiving portion extend in a direction intersecting a moving direction of the secondary molding portion and face and contact each other in parallel.

3. The connector of claim 2, wherein the primary resin material and the secondary resin material are different resin materials, the primary molding portion is a connector housing, the secondary molding portion is a retainer, the connector housing includes a resiliently deformable locking lance for primarily locking a terminal fitting, and the retainer includes a retaining portion for secondarily locking the terminal fitting.

4. The connector of claim 3, wherein the connector housing includes a retainer accommodation recess for accommodating the retainer, and the retainer accommodation recess is open from a surface side facing the retainer in the moving direction of the retainer to a surface side facing the terminal fitting in an inserting direction of the terminal fitting.

5. The connector of claim 4, wherein the connector housing is shaped to be cut in an entire rear-lower part thereof in the retainer accommodation recess if the surface side facing the retainer is a lower surface side of the connector housing and the surface side facing the terminal fitting is a rear surface side of the connector housing.

6. The connector of claim 5, wherein the connector housing includes a housing-side cavity, the retainer includes a retainer-side cavity, the retainer-side cavity and the housing-side cavity communicate in a front-rear direction and form an insertion path for the terminal fitting, and a wall surface forming the insertion path with the retainer assembled at a temporary locking position with respect to the connector housing is continuous from the retainer-side cavity to the housing-side cavity without forming any step.

* * * * *